United States Patent [19]

Ross

[11] Patent Number: 4,670,654

[45] Date of Patent: Jun. 2, 1987

[54] THERMAL IMAGE SENSOR WITH MEANS FOR CONVERTING A PHASE IMAGE INTO AN INSITY MODULATED IMAGE

[75] Inventor: Peter W. Ross, Stansted, England

[73] Assignee: Standard Telephone and Cables Public Limited Company, London, England

[21] Appl. No.: 763,181

[22] Filed: Aug. 7, 1985

[30] Foreign Application Priority Data

Aug. 25, 1984 [GB] United Kingdom ................. 8421627

[51] Int. Cl.⁴ ............................ G02F 1/13; H04N 5/33
[52] U.S. Cl. ..................... 250/331; 350/1.1; 350/351; 358/113
[58] Field of Search .................. 350/342, 347 V, 346, 350/351, 1.1; 250/331, 338; 358/113

[56] References Cited

U.S. PATENT DOCUMENTS

| | | |
|---|---|---|
| 3,335,716 | 8/1967 | Alt .................................. 358/113 X |
| 4,009,934 | 3/1977 | Goodwin et al. ..................... 350/346 |
| 4,031,529 | 6/1977 | Borel et al. .......................... 350/351 |
| 4,114,991 | 9/1978 | Bleha et al. ...................... 350/342 X |
| 4,533,215 | 8/1985 | Trias et al. ........................... 350/342 |
| 4,578,584 | 3/1986 | Baumann et al. .................... 250/338 |
| 4,589,732 | 5/1986 | Shiraishi et al. ................. 350/346 X |

OTHER PUBLICATIONS

Grinberg et al, "Visible to Infrared Image Converter for Dynamic Infrared Target Simulation Applications", SPIE, vol. 226, Infrared Imaging Systems Technology, 1980, pp. 129–132.

Berreman, "Electrical and Optical Properties of Twisted Nematic Structure", *Nonemissive Electrooptic Displays* ed., Kmetz et al., Plenum Press, 1976, pp. 10 & 11.

*Primary Examiner*—John K. Corbin
*Assistant Examiner*—David Lewis
*Attorney, Agent, or Firm*—Kerkam, Stowell, Kondracki & Clarke

[57] ABSTRACT

A thermal image is created in a thermostatically controlled liquid crystal cell (4) containing a two-frequency nematic or cholesteric (3). This is addressed with an alternating potential whose frequency can be swept through the cross-over frequency. By appropriate choice of frequency within this range the thermal image is converted to a phase image which in its turn is converted to a contrast image in conventional manner.

4 Claims, 4 Drawing Figures

THERMAL IMAGE SENSOR WITH MEANS FOR CONVERTING A PHASE IMAGE INTO AN INSITY MODULATED IMAGE

BACKGROUND OF THE INVENTION

This invention relates to a thermal image sensor that utilises a liquid crystal layer as the sensor element.

One example of such a sensor employs a cholesteric layer the pitch of whose helix is particularly strongly temperature dependent. Such a layer is thermostatted to a carefully controlled temperature such that the radiation of a thermal image imaged upon it produces local variations in pitch to produce a thermochromic effect. One of the limitations of this approach to thermal image sensing is that the sensitivity is predetermined by the choice of the cholesteric material. Another limitation is that not only does there have to be a high degree of uniformity of the temperature of the layer over the whole image area before exposure to the radiation of the thermal image, but also the absolute value of that temperature needs to be held within relatively narrow limits.

SUMMARY OF THE INVENTION

The present invention is concerned with sensors for which uniformity of temperature before exposure to the thermal image is still a requirement, but its absolute value is not critical. Another feature of such sensors is that its sensitivity is electrically controllable by varying the amplitude of an applied alternating potential.

According to the present invention there is provided a thermal image sensor incorporating optical means for converting into an intensity modulated image a phase image formed in a two-frequency nematic or cholesteric liquid crystal layer formed in a liquid crystal cell provided with internal transparent sheet electrodes, which sensor also incorporates an imaging system for creating a thermal image in the liquid crystal layer, and, connected across the cell electrodes, a power supply the frequency of whose output is controllable through the cross-over frequency of the liquid crystal layer.

BRIEF DESCRIPTION OF THE DRAWINGS

There follows a description of a thermal imaging system incorporating a thermal sensor embodying the invention in a preferred form. This description refers to the accompanying drawings in which.

DETAILED DESCRIPTION OF PREFERRED EMBODIMENT

Figure 1:
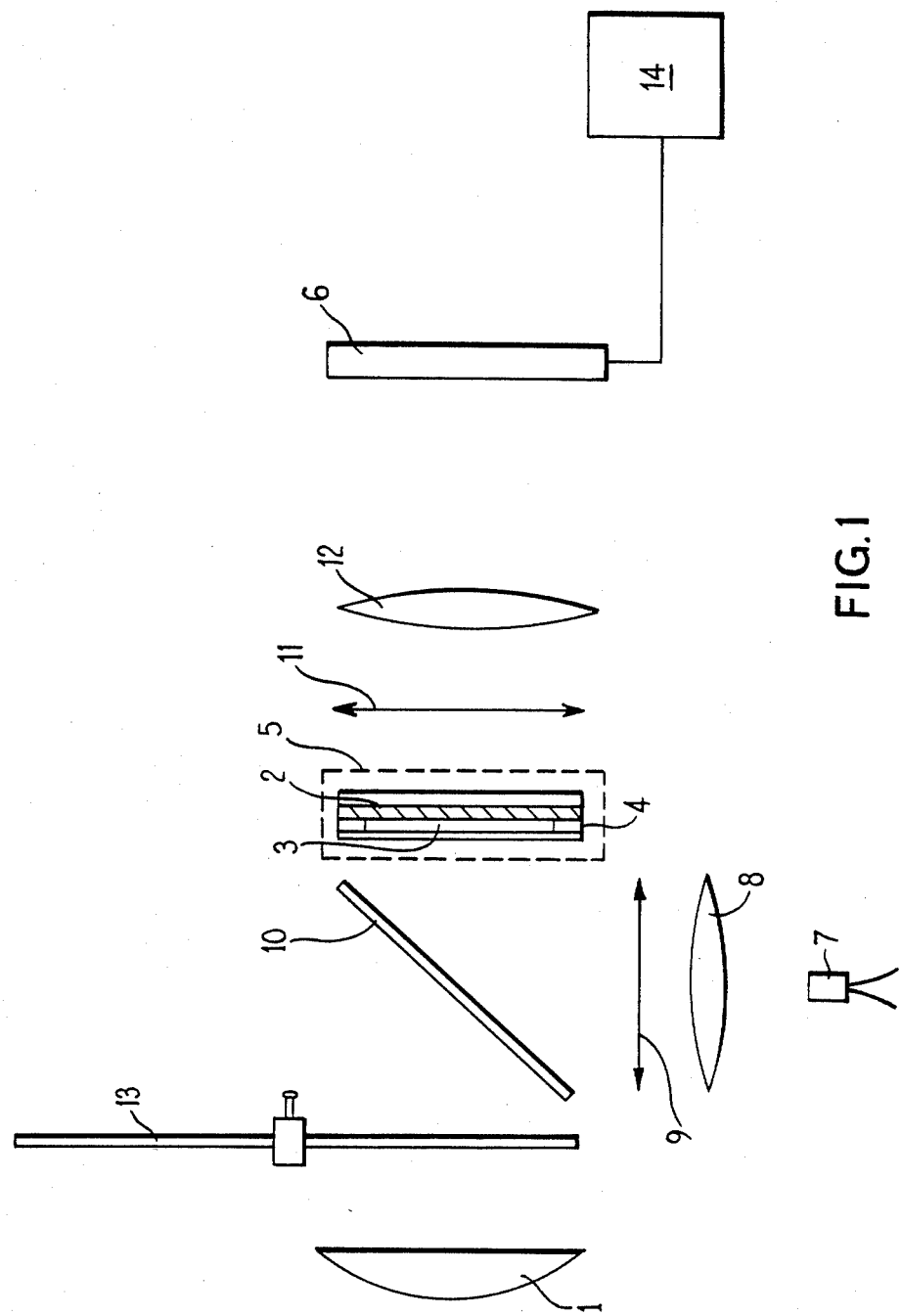
FIG. 1 depicts a schematic diagram of the thermal imaging system.

Referring to FIG. 1 thermal radiation from a scene (not shown) is imaged by a far infra-red (typically about 10 microns) imaging optics 1 upon an absorbing layer 2 in contact with one surface of a liquid crystal layer 3 contained within a liquid crystal cell 4. The cell is contained within a thermostatically controlled chamber 5, and its construction is such as to minimise thermal spreading effects in the thermal image and also thermal mass.

The temperature of the chamber 5 is maintained at a suitable value so that the pattern of small temperature variations appearing over the area of the liquid crystal layer 3 that are created by the differential heating of the thermal image produces changes in alignment of the liquid crystal molecules. Since these molecules are optically anisotropic, the thermal image has resulted in the production of a corresponding optical phase image in the liquid crystal layer. This phase image is in its turn used to generate an intensity contrast image at a conventional two-dimensional video image transducer 6 such as a CCD camera or Vidicon. For this purpose the liquid crystal layer 3 is illuminated with a near infra-red (typically with a wavelength of about 1 micron) source 7 such as an injection laser via a diffusing lens 8, a linear polariser 9 and a germanium mirror 10. The near infra-red light transmitted through the liquid crystal layer then passes through a linear polarisation analyser 11, and imaging optics 12 which forms an image of the layer 3 upon the transducer 6.

A chopper 13 periodically interrupts the far infra-red in synchronisation with the frame scan of the transducer 6. Hence alternate frames of the video output relate to when the liquid crystal layer is being heated by the far infra-red, while the intervening frames relate to when the layer is cooling by virtue of the fact that the far infra-red is obstructed by the chopper. Therefore, the video signal is not in a suitable form for direct application to a conventional CRT type VDU (not shown), but first needs processing in some form of frame store subtractor circuit (not shown). Alternatively, the signal output from the transducer 6 is fed direct to a liquid crystal type VDU 14.

Figure 2:
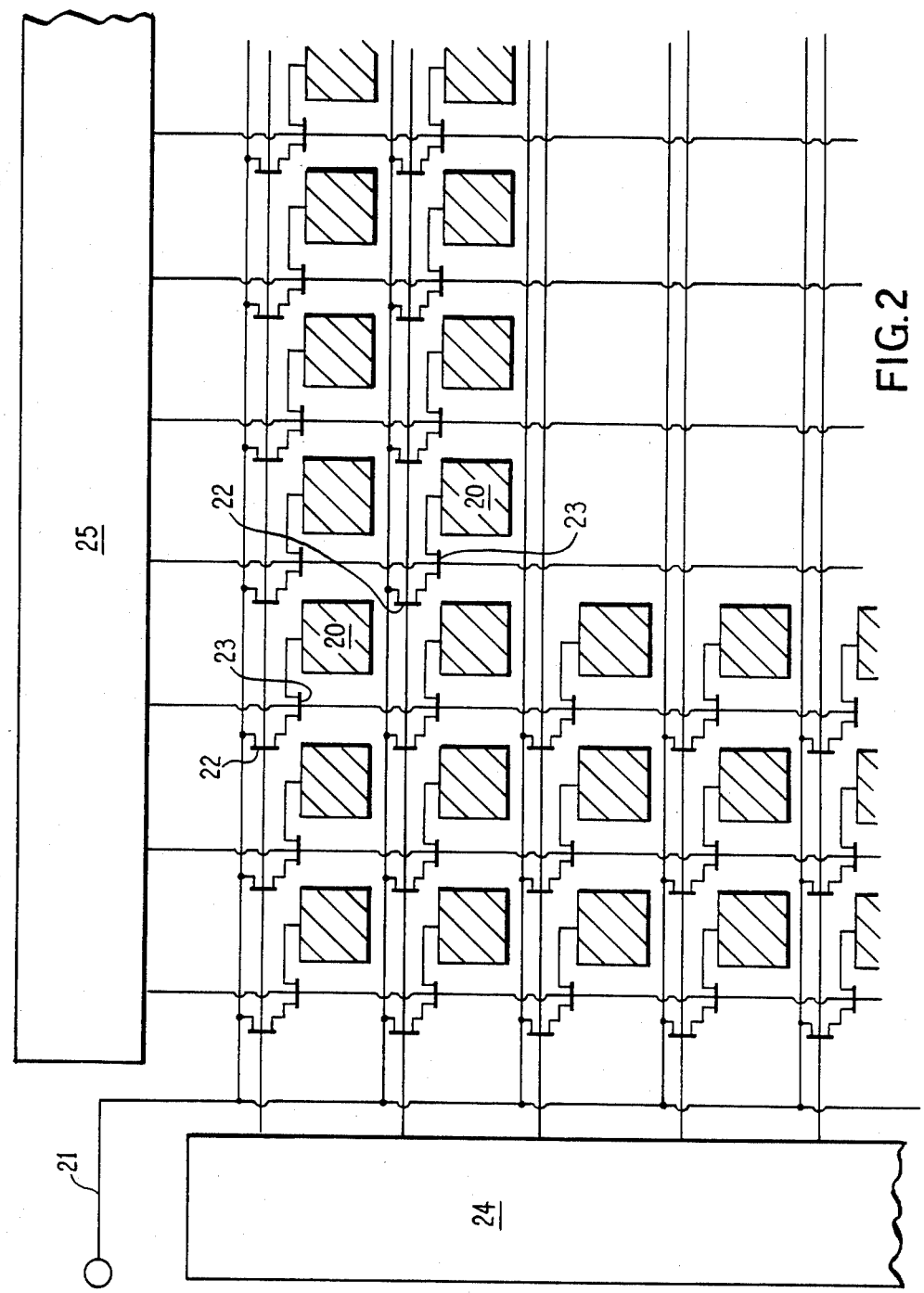
FIG. 2 is a schematic diagram illustrating the mode of operation of the VDU of FIG. 1, and FIGS. 3a and 3b are graphs depicting how the dielectric anisotropy of a two-frequency nematic or cholesteric varies respectively as a function of addressing frequency at various temperatures, and as a function of temperature for various addressing frequencies.

The VDU 14 is an active silicon matrix addressed device whose basic organisation is depicted in FIG. 2.

The pixels of the VDU 14 are arranged in rows and columns, and each pixel is defined by the area of overlap between a rear electrode 20 behind the liquid crystal layer and the transparent front sheet electrode (not shown) in front of that layer. Each rear electrode is connected with a video signal input line 21, which is common to all rear electrodes, via an associated pair of gates 22 and 23 associated with that particular rear electrode. Gate 22 has to do with the row number of that electrode while gate 23 has to do with its column number. Operation of the gates is effected by control circuits 24 and 25. Control circuit 24 has one output line 26 associated with each row of pixel rear electrodes 20, and the gate electrodes of all their associated gates 22 are connected to this output line. Similarly control circuit 25 has one output line 27 associated each column of pixel rear electrodes, and the gate electrodes of their associated gates 23 are connected to this output line. Thus, by appropriate phasing of strobing signals applied to the control circuits 24 and 25, the appropriate parts of the video signal on line 21 are distributed to the appropriate pixel rear electrodes. The transparent front sheet electrode is maintained at a constant potential approximately midway between the levels of corresponding points of consecutive video frames. In this way the liquid crystal layer of the VDU is not exposed to any long term d.c. bias which could be responsible for engendering electrolytic degradation, and frame-to-frame subtraction is automatically effected without recourse to special frame storage measures.

Figure 3A:
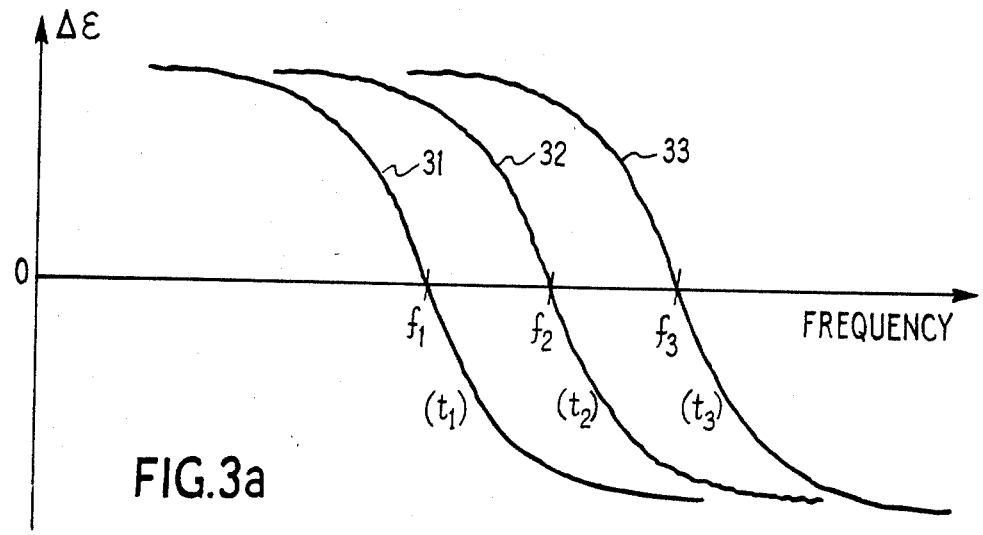
Figure 3B:
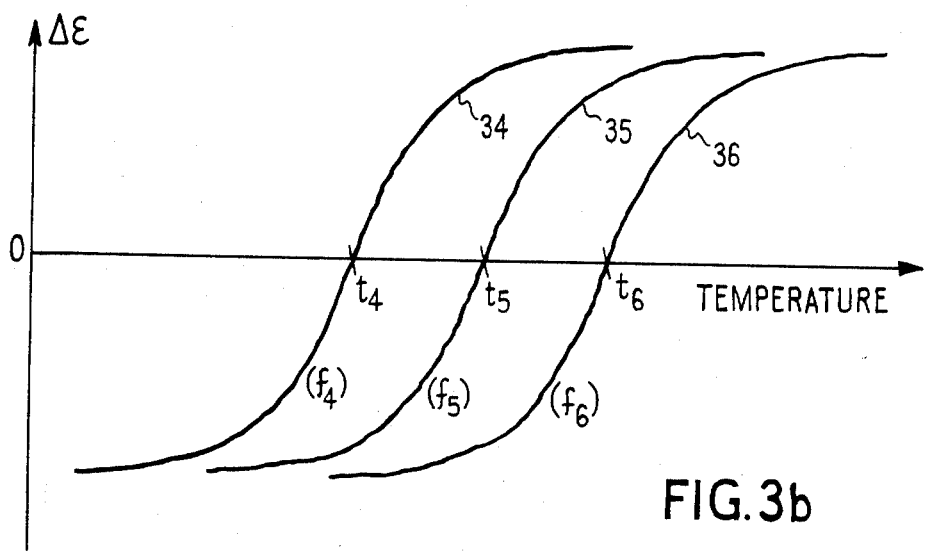

Reverting attention now to the liquid crystal cell 4 in which the thermal image is generated, it has already been said that this cell converts the thermal image into a phase image. This is achieved in this instance by making use of the properties of a nematic liquid crystal layer 3 whose dielectric anisotropy is a function of frequency that exhibits a cross-over frequency beneath which the anisotropy is positive and above which the anisotropy is negative. A typical characteristic for such a material is depicted by curve 32 of FIG. 3a which is the characteristic for a temperature $t_2$. The cross-over frequency depends upon temperature, and curves 31 and 33 depict corresponding characteristics $t_1$ and $t_3$ for temperatures $t_1$ and $t_3$ which are respectively higher and lower than temperature $t_2$. The corresponding cross-over frequencies are $f_1$, $f_2$ and $f_3$ FIG. 3b depicts related characteristics for the material in which the dielectric anisotropy is plotted as a function of temperature. The three curves 34, 35 and 36 show how the temperature for which the dielectric anisotropy is zero, the cross-over temperature, increases as the frequency is reduced from $f_4$ through $f_5$ and $f_6$. From these curves it is evident that if for instance a thermal image is formed in the liquid crystal layer with a temperature range from $t_5$ to $t_6$ there is little to be gained from addressing this layer with a frequency $f_4$ because the anisotropy is only marginally greater at the higher end of the temperature range than the corresponding value at the lower end. In contrast to this if the layer is addressed with a frequency $f_5$ the anisotropy is zero for regions at the lower end of the temperature range, $t_5$ and a significant positive value at the upper end $t_6$. Therefore, this frequency is appropriate for addressing a cell whose inward facing major surfaces have been treated to promote homogeneous alignment of the liquid crystal molecules in the absence of any applied field. In order to circumvent problems of reverse tilt at least one and preferably both of these surfaces are such as to promote homogeneous alignment with a tilt angle, typically at least 1° to 2° (measured with respect to the plane of the surface). This may be provided for instance by a rubbed polyimide surface or by a 5° oblique evaporation of silicon monoxide. The twist in molecular alignment through the thickness of the liquid crystal layer maybe determined in part by the inclusion of a chiral additive and in part by the relative orientation of alignment direction provided at its two major surfaces. Preferred values of twist are 0°, 90°, 180°, 225°, and 270°.

In view of the fact that when using parallel homogeneous alignment on both major surfaces of the liquid crystal layer a noticeable threshold has to be exceeded before realignment starts, it will generally be desirable to address the cell with a frequency for which there is a non-zero positive dielectric anisotropy even at the lowest end of the temperature range. This means that the upper end of the temperature range will extend further on to the shoulder of the characteristic where saturation effects become more noticeable.

Alternatively, the cell can be biassed to its most sensitive state by the application of a low frequency bias (at a frequency well beneath the addressing frequency), in which case the addressing frequency can be chosen such that its cross-over temperature is bracketed by the temperature range of the liquid crystal layer, typically being at the mid-point of that range.

A further alternative avoids the use of a low frequency bias, and instead avoids the threshold problem by the use of parallel homogeneous alignment at only one of the major surfaces of the liquid crystal layer, while the other major surface is homeotropically aligned. In this instance also the addressing frequency can advantageously be chosen so that its cross-over temperature is bracketed by the temperature range of the liquid crystal layer.

Examples of typical 2-frequency nematic material suitable for this application include materials marketed by Hoffman La Roche under the designation Mixture No. 2851 and Mixture No. 3090. The cross-over frequencies for these two materials at 22° C. are quoted as 2.45KHz and 420Hz respectively.

I claim:

1. A thermal image sensor, which sensor includes a thermostatically controlled liquid crystal cell containing a two-frequency liquid crystal layer sandwiched between a pair of internal transparent sheet electrodes; a power supply connected across the electrodes, the output frequency of which power supply is controllable through the cross-over frequency of the liquid crystal layer; means for creating a thermal image in said layer, which image, in the presence of the power supplied by the power supply, is such as to produce a phase image in said layer; and optical means for converting said phase image into an intensity modulated image.

2. A sensor as claimed in claim 1, wherein both major surfaces of the liquid crystal layer are bounded by surfaces promoting parallel homogeneous alignment of the liquid crystal molecules.

3. A sensor as claimed in claim 2, wherein in the absence of any applied field the twist in the liquid crystal layer is substantially an angle selected from the group comprising 0°, 90°, 180°, 225°, and 270°.

4. A sensor as claimed in claim 1, wherein one major surface of the liquid crystal is bounded by a surface promoting parallel homoegeneous alignment of liquid crystal molecules in contact therewith while the other major surfaces of the liquid crystal layer is bounded by a surface promoting homeotropic alignment of the liquid crystal molecules in contact therewith.

* * * * *